United States Patent [19]
Leymann et al.

[11] Patent Number: 6,073,111
[45] Date of Patent: Jun. 6, 2000

[54] CONTAINER MATERIALIZATION/ DEMATERIALIZATION FOR REDUCED DATALOAD AND IMPROVED DATA-COHERENCY IN WORKFLOW-MANAGEMENT SYSTEMS

[75] Inventors: Frank Leymann, Aidlingen; Dieter Roller, Schonaich, both of Germany

[73] Assignee: International Business Machines Corporation, Armonk, N.Y.

[21] Appl. No.: 09/061,015

[22] Filed: Apr. 15, 1998

[30] Foreign Application Priority Data

Apr. 15, 1997 [EP] European Pat. Off. .............. 97106125

[51] Int. Cl.$^7$ ...................................................... G06F 13/00
[52] U.S. Cl. ......................... 705/8; 705/1; 705/7; 705/8; 705/9; 705/32
[58] Field of Search .................................. 705/1, 9, 7, 32, 705/8

[56] References Cited

U.S. PATENT DOCUMENTS

| | | | |
|---|---|---|---|
| 5,535,322 | 7/1996 | Hecht | 395/155 |
| 5,581,691 | 12/1996 | Hsu et al. | 395/183 |
| 5,974,392 | 10/1999 | Endo | 705/8 |

OTHER PUBLICATIONS

Forst, "General purpose work flow languages," Distributed and Parallel Databases, vol. 3, No. 2, p. 187–218, Apr. 1995.
Ritter, Capturing design dynamics—the Concord approach, Proceeding of the 10th International Conference on Data Engineering, Feb. 14, 1994.
Enns, "An integrated system for controlling shop loading and work flow," International Journal of Production Research, vol. 33, No. 10, p. 2801–2820, Oct. 1995.

*Primary Examiner*—Emanuel Todd Voeltz
*Assistant Examiner*—Phillip J. Groutt
*Attorney, Agent, or Firm*—Scully, Scott, Murphy & Presser; Wayne L. Ellenbogen Esq.

[57] ABSTRACT

The present invention relates to the field of integration of applications that are executed by computer systems. In an additional focus, the current invention improves the integration of applications within workflow management systems. The basic approach of the invention to this problem are the features of input container materialization programs and output container dematerialization programs. The materialization programs are executed for an input container before the input container is passed to a process activity. The purpose of the materialization programs is to perform materialization of the input container by retrieving its data members' contents from arbitrary storage areas and/or by manipulating the data-member's contents. The de-materialization programs are executed after a process activity completed execution, and their purpose is to perform de-materialization of the output container by manipulating its data-members' contents and/or storing its data members' contents to arbitrary storage areas.

15 Claims, 2 Drawing Sheets

CONTAINER MATERIALIZATION/ DEMATERIALIZATION FOR REDUCED DATALOAD AND IMPROVED DATA-COHERENCY IN WORKFLOW-MANAGEMENT SYSTEMS

BACKGROUND OF THE INVENTION

1. Technical Field

The present invention relates to the field of integration of applications; said applications being executed by computer systems.

2. Prior Art

Workflow technology is becoming more and more important for the integration of applications. It supports the modelling and execution of business processes. Business processes control which piece of work of a network of pieces of work will be performed by whom and which resources are exploited for this work, i.e. a business process describes how an enterprise will achieve its business goals. The individual pieces of work might be distributed across a multitude of different computer systems connected by some type of network.

The process of designing, developing and manufacturing a new product and the process of changing or adapting an existing product presents many challenges to product managers and engineers to bring the product to market for the least cost and within schedule while maintaining or even increasing product quality. Many companies are realizing that the conventional product design process is not satisfactory to meet these needs. They require early involvement of manufacturing engineering, cost engineering, logistic planning, procurement, manufacturing, service and support with the design effort. Furthermore, they require planning and control of product data through design, release, and manufacturing.

The correct and efficient execution of business processes within a company, e. g. development or production processes, is of enormous importance for a company and has significant influence on company's overall success in the market place. Therefore, those processes have to be regarded similar as technology processes and have to be tested, optimized and monitored. The management of such processes is usually performed and supported by a computer based process or workflow management system (WFMS).

In D. J. Spoon: "Project Management Environment", IBM Technical Disclosure Bulletin, Vol. 32, No. 9A, February 1990, pages 250 to 254, a process management environment is described including an operating environment, data elements, and application functions and processes.

In R. T. Marshak: "IBM's FlowMark, Object-Oriented Workflow for Mission-Critical Applications", Workgroup Computing Report (USA), Vol. 17, No. 5, 1994, page 3 to 13, the object character of IBM FlowMark as a client/server product built on a true object model that is targeted for mission-critical production process application development and deployment is described.

In H. A. Inniss and J. H. Sheridan: "Workflow Management Based on an Object-Oriented Paradigm", IBM Technical Disclosure Bulletin, Vol. 37, No. 3, March 1994, page 185, other aspects of object-oriented modelling on customization and changes are described.

In F. Leymann and D. Roller: "Business Process Management with FlowMark", Digest of papers, Cat. No. 94CH3414-0, Spring COMPCON 94, 1994, pages 230 to 234, the state-of-the-art computer process management tool IBM FlowMark is described. The meta model of IBM FlowMark is presented as well as the implementation of IBM FlowMark. The possibilities of IBM FlowMark for modelling of business processes as well as their execution are discussed. The product IBM FlowMark is available for different computer platforms and documentation for IBM FlowMark is available in every IBM branch.

In F. Leymann: "A meta model to support the modelling and execution of processes", Proceedings of the 11th European Meeting on Cybernetics and System Research EMCR92, Vienna, Austria, Apr. 21 to 24, 1992, World Scientific 1992, pages 287 to 294, a meta model for controlling business processes is presented and discussed in detail.

The "IBM FlowMark for OS/2", document number GH 19-8215-01, IBM Corporation, 1994, available in every IBM sales office, represents a typical modern, sophisticated, and powerful workflow management system. It supports the modelling of business processes as a network of activities; refer for instance to "Modeling Workflow", document number SH 19-8241, IBM Corporation, 1996. This network of activities, the process model, is constructed as a directed, acyclic, weighted, colored graph. The nodes of the graph represent the activities or workitems which are performed. The edges of the graph, the control connectors, describe the potential sequence of execution of the activities. Definition of the process graph is via the IBM FlowMark Definition Language (FDL) or the built-in graphical editor. The runtime component of the workflow manager interprets the process graph and distributes the execution of activities to the right person at the right place, e.g. by assigning tasks to a work list according to the respective person, wherein said work list is stored as digital data within said workflow or process management computer system.

In F. Leymann and W. Altenhuber: "Managing business processes as an information resource", IBM Systems Journal, Vol. 32(2), 1994, the mathematical theory underlying the IBM FlowMark product is described.

In D. Roller: "Verifikation von Workflows in IBM FlowMark", in J. Becker und G. Vossen (Hrsg.): "Geschaeftsprozessmodellierung und Workflows", International Thompson Publishing, 1995, the requirement and possibility of the verification of workflows is described. Furthermore the feature of graphical animation for verification of the process logic is presented as it is implemented within the IBM FlowMark product.

For implementing a computer based process management system, firstly the business processes have to be analyzed and, as the result of this analysis, a process model has to be constructed as a network of activities corresponding to the business process. In the IBM FlowMark product, the process models are not transformed into an executable. At run time, an instance of the process is created from the process model, called a process instance. This process instance is then interpreted dynamically by the IBM FlowMark product.

Application integration basically means sharing of data between independently developed programs or programs which are mutually not aware of their existence. In general, to achieve sharing of data the affected applications must be changed. Consequently, methods are looked for which enable data sharing with as less changes as possible.

In a brief sketch the basic mechanisms used today to integrate applications are outlined below. This mechanisms are not exclusive but often used together.

The most wide-spread method for integrating applications is by introducing sharing of operational data, i.e. of data used and/or manipulated by the applications, between the applications. One method to achieve this is via mutual replication of operational data between the data stores of all affected applications. Another method is to migrate all affected data stores to a single one and rewrite the corresponding applications. A third method introduces a federated database like middleware allowing uniform access to the disparate data stores and rewriting all affected applications on top of this middleware.

A different kind of method found in practice is to integrate applications from an end-user perspective, i.e. by providing new EUIs for all applications to be integrated resulting in a common look-and-feel. Often, the functionalities of the affected applications are encapsulated and externalized in a uniform manner allowing the integration of applications in unforeseeable combinations (OpenDoc, OLE/OCX). In these environments, data are typically not shared (in the sense of accessing a common data store) but exchanged via volatile storage, e.g. via DDE or standardized interfaces for accessor methods.

More and more, WFMS are regarded as middleware for application integration. Their dataflow mechanisms allow applications to pass data to other applications in a uniform manner; this is exchange of data via persistent storage. For this purpose the applications must not be changed to run against a new interface of a new operational data store but it must be able to accept data from the WFMS or to pass data to the WFMS. Very often, the latter changes are considered to be acceptable when compared with the former changes.

Via the WFMS data is passed from one application to another by using the WFMS as the intermediate data store. Applications exchange data via so-called containers. The dataflow mechanism of a WFMS allows to specify the composition of the containers from fields of other containers. When an application gets invoked its input container is constructed based on these specifications and made available to the application. When an application terminates it passes its output via the output container to the WFMS which stores it into its own data store.

A principal problem in the area of application integration via MFMSs is that the amount of data passed from the application to the WFMS is often not appropriate. In such extreme cases applications either return no data at all to the WFMS or to much data.

Existing programs or programs being written as general purpose applications do not output data to a WFMS. Thus, the WFMS does not get the data which is needed by follow-on applications or by the WFMS for determining the next applications to be invoked. The consequences are twofold:

1. The integration features of the WFMS cannot be properly exploited, as a certain amount of data is read and stored via external interfaces from/to persistent storage making applications dependent on these interfaces.
2. The control flow logic of the business process using the corresponding program as activity implementation cannot be properly expressed. This is because it must be based on the "return code" of the program but this mechanism was not invented for indicating business semantics.

Very frequently, when a WFMS is exploited explicitly for application integration the WFMS is misused as an operational database, i.e. the programs written as dedicated activity implementations tend to pass all data possibly needed by other applications in their output container. This has two consequences:

1. Containers become very large because many of the data will not be used by other applications at all, or some data members are very huge (e.g. a document or an image).
2. Since the data in the containers are copies of operational data it becomes outdated: In general, during the time an application puts a data item in a container and another application reads the data from that container different applications modified the data already in the operational data store. Consequently, the container data and operational data run out of synchronization.

SUMMARY OF THE INVENTION

Accordingly, the present invention is based on the objective to improve the integration of applications. A further objective is to improve the integration of applications within workflow management systems (WFMS).

Specifically, the present invention is directed to a computer system managing and executing at least one process-activity having associated with it at least one input-container, said input-container encompassing at least one data-member storing data said process-activity is operating with, wherein said computer system comprises:

materialization-means enhancing said input-container; said materialization-means being executed before said input-container is passed to said process-activity and said materialization-means performing materialization of said input-container by materializing said data-member by retrieving said data-member's contents from arbitrary storage areas and/or by manipulating said data-member's contents. The arbitrary storage areas are either internal or external the system. Moreover the materialization means may manipulate the data members' contents without any limitation.

The technique proposed by the current invention achieves a new level of separation of the business logic within activities from the data the business logic is operating on. The current invention allows to separate the implementation of business algorithms from the implementation of accessing and manipulating persistent data. It is possible to write activity implementations which do not deal with accessing persistent data at all: Implicitly, persistent data is read via materialized input container based on standardized container manipulations, independent from the concrete data store used. Such a technique especially enhances the portability and reusability of such an activity implementation. In practice it supports that different groups of programmers are implementing application logic and data access. Therefore an activity programmer can concentrate on providing the proper business algorithm, and a container programmer will concentrate on preparing containers from data stores and for data stores. Further by clearly conceptually separating the application logic from data access logic improves intelligibility of program design. Moreover the current invention allows to reduce redundancy of data: Operational data can be separated from remaining container data by substituting aggregations of container members by a reference stored in the container as a footprint.

According to the present invention, the materialization means may encompass a multitude of materialization programs. Furthermore the materialization programs are combined into a materialization chain and the materialization chain is configurable to execute the materialization programs in parallel, or sequentially or in mixtures thereof. By this approach the materialization programs may be combined to any possible complexity to retrieve and manipulate the operational data an activity is working on. In a sequential execution mode for instance the various materialization programs may operate in stages to prepare the data for its processing by the activity. As the materialization programs do operate independently from one another an ideal integration mechanism is created as further materialization programs may added or deleted without affecting the other materialization programs.

Each of the above-said materialization programs is being executed based on the current contents of said input-container. Such an approach allows that a certain materialization program may process the input container based on the results of its predecessors.

Further, the materialization means may complete the materialization process of the input container if the last materialization program of said materialization chain completed execution. According to this feature of the invention the sequence in which the materialization programs are executed is freely configurable as the completion of the last materialization program sufficiently identifies the completion of the whole materialization process.

It is further noted that the materialization means may be part of said input container and/or may be part of said data member. A teaching along this lines offers the freedom to establish the materialization means on a per input container basis or even on a per data member basis. The later option allows a significantly finer granularity the materialization process.

The present invention further relates to a computer system managing and executing at least one process activity having associated with it at least one output container. Said output container is typically encompassing one or more data members storing data which is the processing result of the process activity. The current invention teaches de-materialization means enhancing said output container. The de-materialization means are executed after the process activity completed execution. The de-materialization means are performing de-materialization of the output container by in turn de-materializing the data members by manipulating the data members' contents without any limitation. Finally their contents can be stored to arbitrary storage areas internal or external the system of volatile or persistent type.

The technique proposed by the current invention achieves a new level of separation of the business logic within activities from the data the business logic is operating on. The current invention allows to separate the implementation of business algorithms from the implementation of accessing and manipulating persistent data. It is possible to write activity implementations which do not deal with accessing persistent data at all: Implicitly, persistent data is written to output container based on standardized container manipulations, independent from the concrete data store used. Such a technique especially enhances the portability and reusability of such an activity implementation. In practice it supports that different groups of programmers are implementing application logic and data access. Therefore an activity programmer can concentrate on providing the proper business algorithm, and a container programmer will concentrate on preparing containers from data stores and for data stores. Further by clearly conceptually separating the application logic from data access logic improves intelligibility of program design. Moreover the current invention allows to reduce redundancy of data: Operational data can be separated from remaining container data by substituting aggregations of container members by a reference stored in the container as a footprint. The amount of changes required for existing programs to be integrated with other programs via output containers is reduced. For example, only references to internal data of the application can be passed via the output container, and newly provide dematerialization programs can then retrieve data assumed to be in the output container by other programs.

Similar to the presnt invention as described above with respect to materialization-means, the de-materialization-means may also encompass a multitude of de-materialization programs. Furthermore the de-materialization programs are combined into a de-materialization chain and the de-materialization chain is configurable to execute the de-materialization programs in parallel, or sequentially or in mixtures thereof.

By this approach the de-materialization programs may be combined to any possible complexity to manipulate and/or store the operational data processed by an activity. In a sequential execution mode for instance the various de-materialization programs may operate in stages to post-process the data being processed by the activity. As the de-materialization programs do operate independently from one another an ideal integration mechanism is created as further de-materialization programs may added or deleted without affecting the other de-materialization programs.

Each of the above-said de-materialization programs is being executed based on the current contents of said output-container. Such an approach allows that a certain de-materialization program may process the output container based on the results of its predecessors.

Further, the de-materialization means may complete the de-materialization process of the output container if the last de-materialization program of said de-materialization chain completed execution. According to this feature of the invention the sequence in which the de-materialization programs are executed is freely configurable as the completion of the last de-materialization program sufficiently identifies the completion of the whole de-materialization process.

It is further noted that the de-materialization means may be part of said output container and/or may be part of said data-member. A teaching along this lines offers the freedom to establish the de-materialization means on a per output container basis or even on a per data member basis. The later option allows a significantly finer granularity the de-materialization process.

The present invention is further directed to a computer system as described above wherein the process activity and the input container and the output container are part of a process model for a workflow process environment managed and executed by said computer system.

Due to this teaching above mentioned benefits are unfolded especially within WFMS being an area for which application integration is of outstanding importance.

Specifically, the present invention is further directed to a computer system acting as a workflow-management-system (WFMS) managing and executing at least one process-model said process-model encompassing at least one connector said connector being associated with at least one condition-parameter, its truth value indicating to said WFMS whether to follow said connector, said computer system being further characterized by parameter-determination-means encompassing at least one parameter-determination-program said parameter-determination-program being executed to retrieve said conditions-parameter's contents from arbitrary storage areas and/or to manipulate said condition-parameter's contents before said WFMS is evaluating said condition-parameter's truth value.

Such an approach offers analogous advantages as already described with the materialization means of input containers.

BRIEF DESCRIPTION OF THE DRAWINGS

Preferred embodiments of the present invention will now be described, by way of example only, with references to the accompanying drawings, in which.

DETAILED DESCRIPTION OF THE PREFERRED EMBODIMENTS OF THE INVENTION

Figure 1:
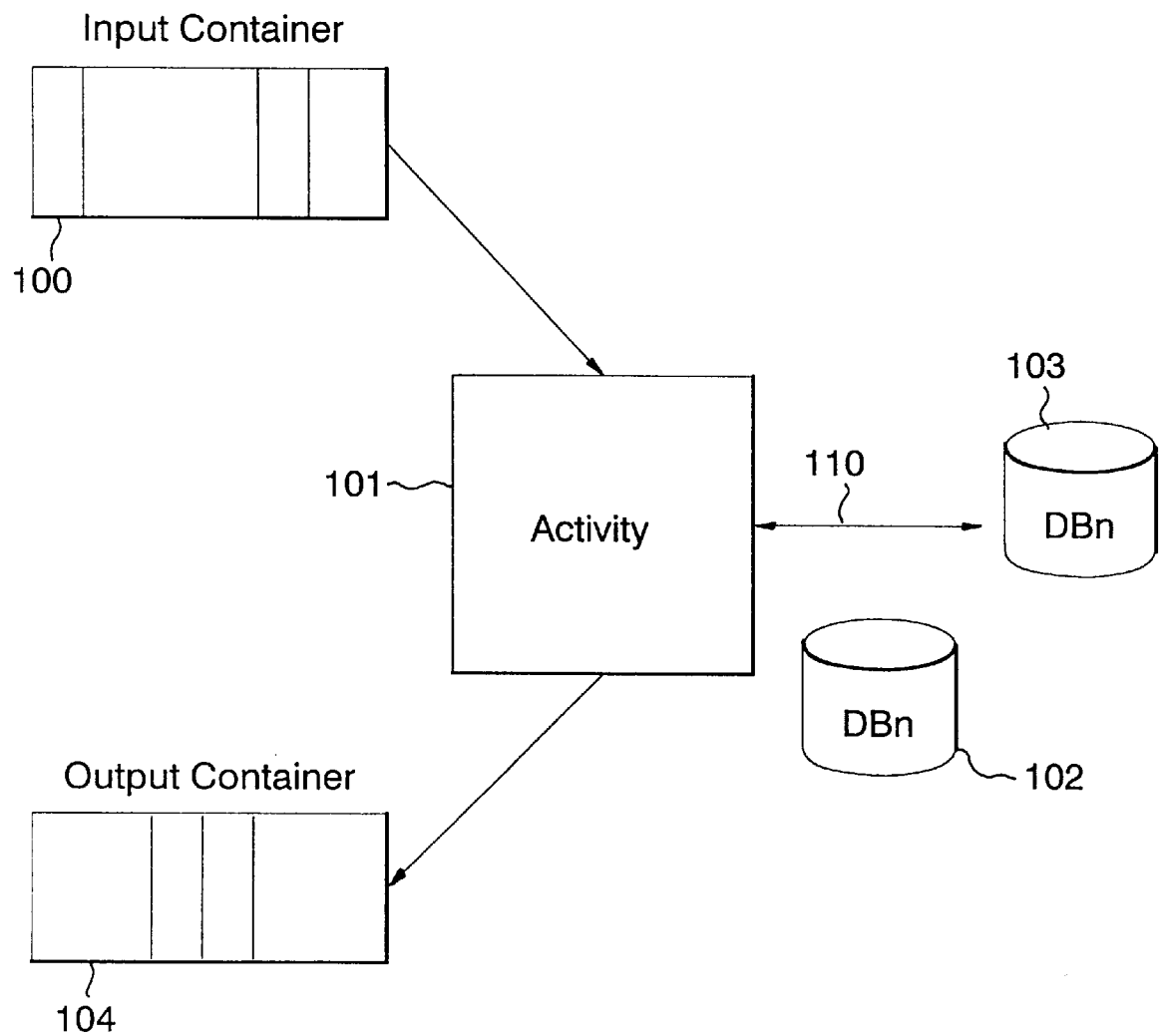
FIG. 1 is a diagram reflecting the usage of input and/or output containers by an example application according to the current state of the art

The current invention is illustrated based on IBM's FlowMark workflow management system. Of course any other WFMS could be used instead. Though the current teaching is outlined in a WFMS environment, as an area of technology in which significant benefits are achieved, it also applies to any other type of system with a multitude of different applications.

The following is a short outline on the basic concepts of a workflow management system based on IBM's FlowMark WFMS:

From an enterprise point of view the management of business processes is becoming increasingly important: business processes or process for short control which piece of work will be performed by whom and which resources are exploited for this work, i.e. a business process describes how an enterprise will achieve its business goals. A WFMS may support both, the modeling of business processes and their execution.

Modeling of a business process as a syntactical unit in a way that is directly supported by a software system is extremely desirable. Moreover, the software system can also work as an interpreter basically getting as input such a model: The model, called a process model or workflow model, can then be instantiated and the individual sequence of work steps depending on the context of the instantiation of the model can be determined. Such a model of a business process can be perceived as a template for a class of similar processes performed within an enterprise; it is a schema describing all possible execution variants of a particular kind of business process. An instance of such a model and its interpretation represents an individual process, i.e. a concrete, context dependent execution of a variant prescribed by the model. A WFMSs facilitates the management of business processes. It provides a means to describe models of business processes (build time) and it drives business processes based on an associated model (run time). The meta model of IBM's WFMS FlowMark, i.e. the syntactical elements provided for describing business process models, and the meaning and interpretation of these syntactical elements, is described next.

A process model is a complete representation of a process, comprising a process diagram and the settings that define the logic behind the components of the diagram. Using various services provided by FlowMark these buildtime definitions the process models are then converted into process templates for use by FlowMark at runtime. Important components of a FlowMark process model are:

Processes
Activities
Blocks
Control Flows
Connectors
Data Containers
Data Structures
Conditions
programs
Staff Not all of these elements will be described below.

On this background a process, modeled by a process model within FlowMark, is a sequence of activities that must be completed to accomplish a task. The process is the top-level element of a FlowMark workflow model. In a FlowMark process, it can be defined:

How work is to progress from one activity to the next

Which persons are to perform activities and what programs they are to use

Whether any other processes, called subprocesses, are nested in the process Of course multiple instances of a FlowMark process can run in parallel.

Activities are the fundamental elements of the meta model. An activity represents a business action that is from a certain perspective a semantical entity of its own. With the model of the business process it might have a fine-structure that is then represented in turn via a model, or the details of it are not of interest at all from a business process modeling point of view. Refinement of activities via process models allows for both, modeling business processes bottom-up and top-down. Activities being a step within a process represents a piece of work that the assigned person can complete by starting a program or another process. In a process model, the following information is associated with each activity:

What conditions must be met before the activity can start

Whether the activity must be started manually by a user or can start automatically What condition indicates that the activity is complete Whether control can exit from the activity automatically or the activity must first be confirmed as complete by a user How much time is allowed for completion of the activity Who is responsible for completing the activity Which program or process is used to complete the activity What data is required as input to the activity and as output from it A FlowMark process model consists of the following types of activities:

Program activity: Has a program assigned to perform it. The program is invoked when the activity is started. In a fully automated workflow, the program performs the activity without human intervention. Otherwise, the user must start the activity by selecting it from a runtime work list. Output from the program can be used in the exit condition for the program activity and for the transition conditions to other activities.

Process activity: Has a (sub-)process assigned to perform it. The process is invoked when the activity is started. A process activity represents a way to reuse a set of activities that are common to different processes. Output from the process, can be used in the exit condition for the process activity and for the transition conditions to other activities.

The flow of control, i.e. the control flow through a running process determines the sequence in which activities are executed. The FlowMark workflow manager navigates a path through the process that is determined by the evaluation to true of start conditions, exit conditions, and transition conditions.

The results that are in general produced by the work represented by an activity is put into an output container, which is associated with each activity. Since an activity will in general require to access output containers of other activities, each activity is associated in addition with an input container too. At run time, the actual values for the formal parameters building the input container of an activity represent the actual context of an instance of the activity. Each data container is defined by a data structure. A data structure is an ordered list of variables, called members, that have a name and a data type. Data connectors represent the transfer of data from output containers to input containers. When a data connector joins an output container with an input container, and the data structures of the two containers match exactly, the FlowMark workflow manager maps the data automatically.

Connectors link activities in a process model. Using connectors, one defines the sequence of activities and the transmission of data between activities. Since activities might not be executed arbitrarily they are bound together via control connectors. A control connector might be perceived as a directed edge between two activities; the activity at the connector's end point cannot start before the activity at the start point of the connector has finished (successfully). Control connectors model thus the potential flow of control within a business process model. Default connectors specify where control should flow when the transition condition of no other control connector leaving an activity evaluates to true. Default connectors enable the workflow model to cope with exceptional events. Data connector specify the flow of data in a workflow model. A data connector originates from an activity or a block, and has an activity or a block as its target. One can specify that output data is to go to one target or to multiple targets. A target can have more than one incoming data connector.

Conditions are the means by which it is possible to specify the flow of control in a process. In FlowMark process models logical expressions can be defined that are evaluated by FlowMark at runtime to determine when an activity may start, end, and pass control to the next activity. Start conditions are conditions that determine when an activity with incoming control connectors can start. The start condition may specify that all incoming control connectors must evaluate to true, or it may specify that at least one of them must evaluate to true. Whatever the start condition, all incoming connectors must be evaluated before the activity can start. If an activity has no incoming control connectors, it becomes ready when the process or block containing it starts. In addition, a Boolean expression called transition condition is associated with each control connector. Parameters from output containers of activities having already produced their results are followed as parameters referenced in transition conditions. When at run time an activity terminates successfully all control connectors leaving this activity are determined and the truth value of the associated transition conditions is computed based on the actual values of their parameters. Only the end points of control connectors the transition conditions of which evaluated to TRUE are considered as activities that might be executed based on the actual context of the business process. Transition conditions model thus the context dependent actual flow of control within a business process (i.e. an instance of a model). Business processes encompass long running activities in general; such an activity need to be allowed to become interrupted. Thus, termination of an activity does not necessarily indicate that the associated task has been finished successfully. In order to allow the measurement of successfullness of the work performed by an activity a Boolean expression called exit condition is associated with each activity. Exactly the activities the exit condition of which evaluated to true in the actual context are treated as successfully terminated. For determination of the actual control flow precisely the successfully terminated activities are considered. Thus the logical expression of an exit condition, if specified, must evaluate to true for control to pass from an activity or block.

Beside describing the potential flow of control and data between activities a business process model also encompasses the description of the flow of the activities itself between "resources" actually performing the pieces of work represented by each activity. A resource may be specified as a particular program, person, a role, or an organizational unit. At run time tasks are resolved into requests to particular persons to perform particular activities resulting in workitems for that person. Staff assignments are the means to distribute activities to the right people in the sequence prescribed by the control flow aspect of a business process model. Each activity in a process is assigned to one or more staff members defined in the FlowMark database. Whether an activity is started manually by the user or automatically by the FlowMark workflow manager, and whether it requires user interaction to complete or completes automatically, a staff member must be assigned to it. FlowMark staff definition entails more than identifying people at your enterprise to the FlowMark database. For each person defined, you can specify a level, an organization, and multiple roles. These attributes can be used at run time to dynamically assign activities to people with suitable attributes.

In the FlowMark workflow manager, program means a computer-based application program that supports the work to be done in an activity. Program activities reference executable programs using the logical names associated with the programs in FlowMark program registrations. The program registration can contain run-time parameters for the executable program.

FlowMark consists, at the coarsest level, of a build time component and a run time component. The build time component supports the modeling of business processes according to the meta model described above and the run time component supports the corresponding semantics. Both components are implemented in a client/server structure. The client delivers the interaction with the user via an object-oriented graphical interface, invokes local tools, and provides animation. The server maintains the database for process instances, navigates through the process graph, and assigns the activities to the proper resources.

Process definition includes modeling of activities, control connectors between the activities, input/output container, and data connectors. A process is represented as a directed acyclic graph with the activities as nodes and the control/data connectors as the edges of the graph. The graph is manipulated via a built-in, event-driven, CUA compliant graphic editor. The data containers are specified as named data structures. These data structures themselves are specified via the DataStructureDefinition facility. FlowMark distinguishes three main types of activities: program activities, process activities, and blocks. Program activities are implemented through programs. The programs are registered via the Program Definition facility. Blocks contain the same constructs as processes, such as activities, control connectors etc. They are however not named and have their own exit condition. If the exit condition is not met, the block is started again. The block thus implements a Do Until construct. Process activities are implemented as processes.

These subprocesses are defined separately as regular, named processes with all its usual properties. Process activities offer great flexibility for process definition. It not only allows to construct a process through permanent refinement of activities into program and process activities (top-down), but also to build a process out of a set of existing processes (bottom-up). In particular, process activities help to organize the modeling work if several process modeler are working together. It allows the team members to work independently on different activities. Program and process activities can be associated with a time limit. The time limit specifies how long the activity may take. If the time is exceeded, a designated person is notified. If this person does not react within another time limit, the process administrator is notified. It not only helps to recognize critical situation but also to detect process deficiencies as all notifications are recorded in an audit trail.

All data structures used as templates for the containers of activities and processes are defined via the Data Structure Definition Facility. Data Structures are names and are defined in terms of elementary data types, such as float, integer, or string and references to existing data structures. Managing data structures as separate entities has the advantage that all interfaces of activities and their implementations are managed consistently in one place (similar to header files in programming languages).

All programs which implement program activities are defined via the Program Registration Facility. Registered for each program is the name of the program, its location, and the invocation string. The invocation string consists of the program name and the command string passed to the program.

Before process instances can be created, the process model must be translated to ensure the correctness and completeness of the process model. The translated version of the model is used as a template when a process instance is created. This allows to make changes to the process model without affecting executing process instances. A process instance is started either via the graphical interface of via the callable process application programming interface. When a process is started, the start activities are located, the proper people are determined, and the activities are posted onto the work list of the selected people. If a user selects the activity, the activity is executed and removed from the work list of any other user to whom the activity has been posted. After an activity has executed, its exit condition is evaluated. If not met, the activity is rescheduled for execution, otherwise all outgoing control connectors and the associated transition conditions are evaluated. A control connector is selected, if the condition evaluates to TRUE. The target activities of the selected control connectors are then evaluated. If their start conditions are true, they are posted to the work list of selected people. A process is considered terminated, if all end activities have completed. To make sure that all end activities finish, a death path analysis is performed. It removes all edges in the process graph which can never be reached due to failing transition conditions. All information about the current state of a process is stored in the database maintained by the server. This allows for forward recovery in the case of crashes.

Application Integration in WFMS According To Prior Art

FIG. 1 is a diagram reflecting the usage of input and/or output containers by an example application according to the current state of the art showing the dependency of an application on the peculiarities of the data representation and the places and media its operational data is stored. Within FIG. 1 the input container 100, containing certain parts of operational data, is passed to the activity 101. The activity 101 itself is responsible to locate, retrieve, translate into internal representation the main portion of its operational data. Typically it has to exploit a multitude of pathes 110 for accessing this data stored in any type and number of places 102, 103 encompassing for example databases, files, other computer systems or volatile storage of any kind. Through this type of approach the activity has become dependent on the various storage places. Once the activity 101 completed the essential part of its processing it has to store the manipulated operational data back into their correct storages places 102, 103 and/or return processing results via the output container 104 for further usage by succeeding activities.

Concepts

The main idea behind the current teaching and solution to the integration of applications is to enhance the logic processing of a WFMS as follows:

1. Input containers and their contents are constructed by a new type of programs called (container) materialization programs.
2. Output containers and their contents are stored by a new type of programs called (container) dematerialization programs.
3. Actual parameters of workflow relevant predicates (e.g. exit conditions or transition conditions in FlowMark) are provided by parameter determination programs.

It is subject of the workflow specification whether such programs are invoked in addition to the standard processing of the WFMS or as a substitute or not at all.

Therefore the basic approach according to the current invention is to dynamize the input and output containers and the WFMS relevant parameters and allow them to provide the operational data to the integrated application in application-appropriate representations and also to store the operational data once the applications finished processing to any type of persistent or volatile storage.

Materialization/Dematerialization Chains

The concept of materialization/dematerialization chains, unfolded below, may be realized on a per activity base, a per predicate base on the base of individual data members within a container or mixtures thereof, respectively. The current teaching allows for all of these approaches. For simplicity the description below will assume materialization/dematerialization chains on a per activity base.

The standard processing of how the WFMS itself is materializing the input container of an activity implementation A and dematerializing A's output container is considered as system provided materialization and dematerialization programs $M^A$ and $D^A$. Now, according to the current proposal each activity implementation A can be associated with a series of materialization programs $M_1, \ldots, M_{n(A)}$ and dematerialization programs $D_1, \ldots, D_{m(A)}$. We call $M_1, \ldots, M_{n(A)}$ the materialization chain of A and $D_1, \ldots, D_{m(A)}$ its dematerialization chain. How chains are implemented, e.g. via a pipe or via a script, whether parallelism is allowed or not etc., is irrelevant for the current teaching; important is that each member of the chain has access to the container as manipulated by its predecessor.

Omitting the system provided programs $M^A$ or $D^A$ from the corresponding chain means that they are substituted. Otherwise, by adding them at a certain position to the chain the system provided programs are part of the container materialization or dematerialization processing.

Figure 2:
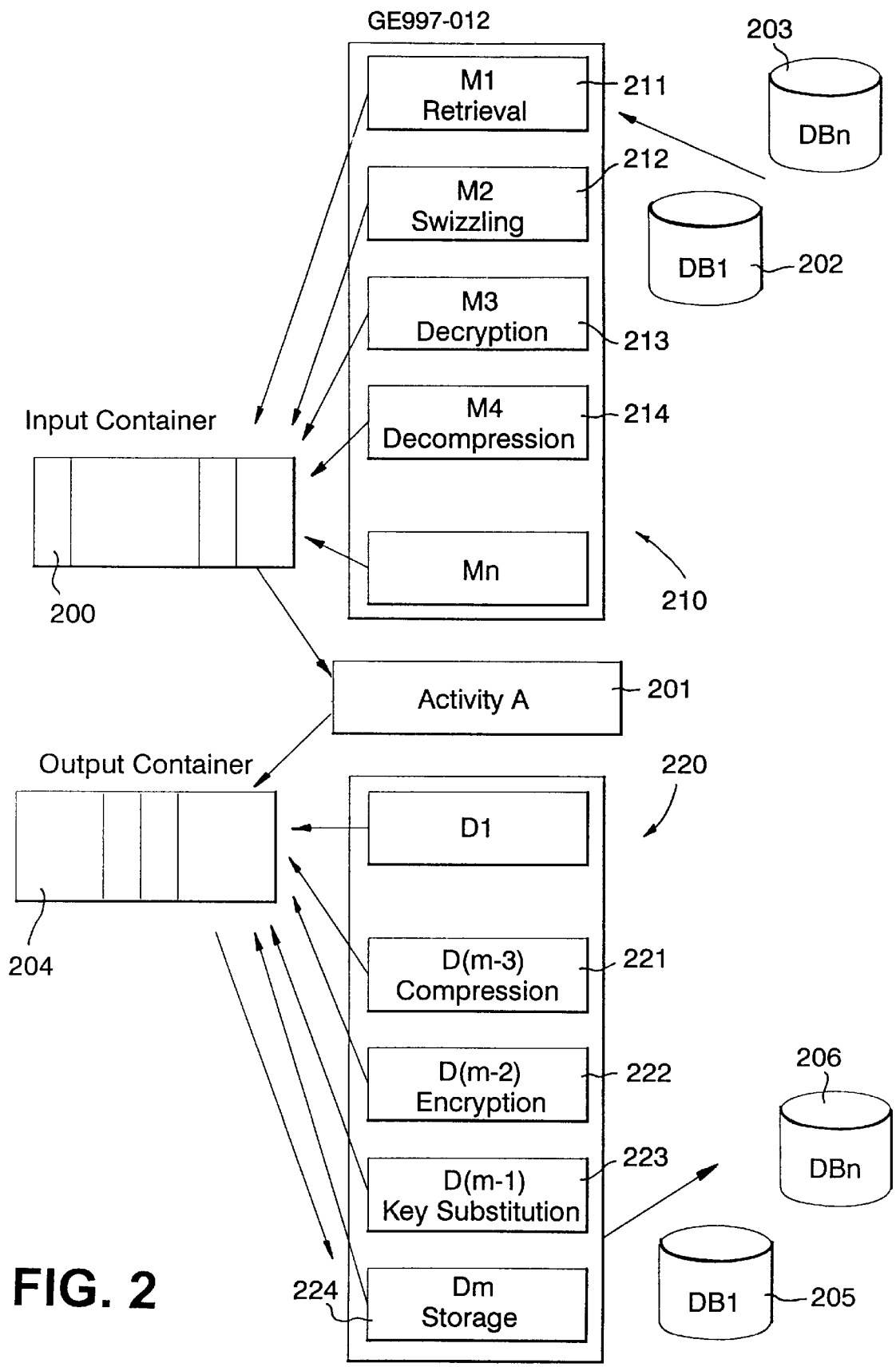
FIG. 2 is a visualization according to current invention reflecting the decoupling approach of an example application of its operational data

FIG. 2 gives a visualization of the current teaching reflecting the materialization chain 210 and the dematerialization chain 220 of an activity A 201.

Processing Materialization Chains

Before invoking an activity implementation A the WFMS will invoke A's materialization chain $M_1, \ldots M_{n(A)}$ (in the given "order"). Here, "order" implies that the WFMS uses a particular mechanism to determine the actual order at run time, e.g. based on a script attached to the chain, or by the canonical order represented by the list of materialization program itself; it can even be an automatic workflow. When $M_{n(A)}$ returns (or when the script returns—depending on the technique used to establish an "order") the input container of the activity implementation A is considered to be constructed.

Thus each member of the materialization chain is invoked to contribute to the construction of the associated activity implementation's input container. The processing of a materialization program can be manifold, e.g. accessing an external database to provide missing values for particular container members or overwriting values of container member, decryption or decompression of container members etc.

For example, the first element of the materialization chain of activity implementation A may be the system provided materialization program $M^A$. This program especially provides the values of the predefined members of the container like process information and activity information and a few other values for some container members. The second materialization program invoked may access a relational database to fetch additional data and an identifier of an image needed by the activity implementation. The third materialization program uses this identifier to fetch the image from a library. Since the image is compressed a fourth materialization program is required which decompresses the image. After that, the materialization of the input container is finished and it is passed to the activity implementation.

In another example, the invoked application may be a business object. The container passed by the default materialization program $M^A$ to the second materialization program may only provide values of some object identifications, like the identification of the target object and identifications of objects which are accessed by the second materialization program to get the required values for to complete the input container.

Referring to FIG. 2 the materialization chain 210 encompasses a materialization program 211 $M_1$ for retrieving operational data from any type of persistent or volatile storage 202 and 203. It further encompasses a materialization program 212 $M_2$ performing key swizzling, a materialization program 213 $M_3$ performing decryption of current input container data and a materialization program 214 $M_4$ to decompress input container data.

Processing Dematerialization Chains

When an activity implementation A returns, the WFMS will invoke the dematerialization chain $D_1, \ldots D_{m(A)}$ (in the given order). When $D_{m(A)}$ returns the output container of the activity implementation is considered to be processed and stored (the same remarks on "order" and "returns" apply as above).

Each member of the dematerialization chain will get as input the output container as it has been modified by its predecessor. As with materialization chains the processing of dematerialization programs in dematerialization chains can be manifold: Encryption or compression might occur, values of container members might be stored into external databases and erased from the output container or substituted by references to the proper values, etc.

Examples of dematerialization chains can be easily constructed in correspondence of the examples given above.

Referring to FIG. 2 the dematerialization chain 220 encompasses a dematerialization program 221 $D_{m-3}$ for compressing output container data, dematerialization program 222 $D_{m-2}$ encryption and a dematerialization program 223 $D_{m-1}$ performing key substitution. Finally the dematerialization chain encompasses a dematerialization program 224 $M_m$ to store operational data to any type of persistent or volatile storage 205 and 206.

Parameter Determination Programs

The same approach disclosed for the input and output containers may also be applied to various parameters being of importance for workflow relevant predicates, like exit conditions, transition conditions etc. Each of these parameters may be provided by a parameter determination program delivering the most current value of this parameter before the WFMS will use this particular parameter for deciding on the execution of the next activity.

The current invention allows to separate the implementation of business algorithms from the implementation of accessing and manipulating persistent data. It is possible to write activity implementations which do not deal with accessing persistent data at all: Implicitly, persistent data is read via materialized input container and written via dematerialized output container based on standardized container manipulations, independent from the concrete data store used. Such a technique especially enhances the portability and reusability of such an activity implementation.

In practice, different groups of programmers are implementing application logic and data access; thus, the current invention allows to regard this fact when implementing activities for workflows. Therefore an activity programmer can concentrate on providing the proper business algorithm, and a container programmer will concentrate on preparing containers from data stores and for data stores. This will make programming of activity implementations even more straightforward, especially when being based on visual builders. Further by clearly conceptually separating the application logic from data access logic improves intelligibility of program design.

The current invention also allows to reduce redundancy of data: Operational data can be separated from remaining container data by substituting aggregations of container members by a reference stored in the container as a footprint. This substitution is performed by dematerialization programs; corresponding materialization programs will swizzle the references and establish access to the proper data members via container methods.

This has two main consequences:

1. The consistency between container data stored in the WFMS and the corresponding operational data stored in an external data store is improved. Since in practice, operational data is frequently the target for updates by applications (transactions, . . . ) which are not invoked via a WFMS, storing copies of this data in containers can result in outdated information passed to programs by the WFMS via its container mechanism.
2. The dataload of the WFMS's underlying database is reduced. Removing redundant data from containers reduces the size of the containers stored in the WFMS's database. This will increase the availability of the WFMS's database by speeding up database administration processes like reorganizations, for example.

The amount of changes required for existing programs to be integrated with other programs via a WFMS is reduced. For example, only references to internal data of the application can be passed to the WFMS via the output container, and newly provide dematerialization programs can then retrieve data assumed to be in the output container by other programs or the WFMS (for navigation purposes, or for mapping to other activities' input containers required by their materialization programs).

Dematerialization programs may pump aggregations of members of output containers into multiple different data stores, thus, performing data replication. This contributes to application integration via common data stores which an enterprise might have chosen in addition to integration via a WFMS. The invoked dematerialization programs can of course use other sources of data for enrichment, cleaning, ... or produce other as a side effects.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A computer system managing and executing at least one process-activity having associated with it at least one input-container, said input-container encompassing at least one data-member storing data said process-activity is operating with, wherein said computer system comprises:

materialization-means enhancing said input-container;

said materialization-means being executed before said input-container is passed to said process-activity and said materialization-means performing materialization of said input-container by materializing said data-member by at least one of (i) retrieving said data-member's contents from arbitrary storage areas and (ii) manipulating said data-member's contents.

2. A computer system according to claim 1, wherein said materialization-means encompassing a multitude of materialization-programs, said materialization-programs being combined into a materialization-chain and said materialization-chain being configurable to execute said materialization-programs in parallel, or sequentially or in mixtures thereof.

3. A computer system according to claim 2, wherein each of said materialization-program is being executed based on the current contents of said input-container.

4. A computer system according to claim 3, wherein said materialization-means completed said materialization of said input-container if the last materialization-program of said materialization-chain completed execution.

5. A computer system according to claim 2, wherein said materialization-means completed said materialization of said input-container if the last materialization-program of said materialization-chain completed execution.

6. A computer system according to claim 1, wherein said materialization-means is at least one of (i) part of said input-container and (ii) part of said data-member.

7. A computer system according to claim 1, wherein said process-activity and said input-container and said output-container is part of a process-model for a workflow-process-environment managed and executed by said computer system.

8. A computer system managing and executing at least one process-activity having associated with it at least one output-container, said output-container encompassing at least one data-member storing data being the processing result of said process-activity, being characterized by de-materialization-means enhancing said output-container;

said de-materialization-means being executed after said process-activity completed execution and said de-materialization-means performing de-materialization of said output-container by de-materializing said data-member by manipulating said data-member's contents and/or storing data-member's contents to arbitrary storage areas.

9. A computer system according to claim 8, wherein said de-materialization-means encompassing a multitude of de-materialization-programs, said de-materialization-programs being combined into a de-materialization-chain and said de-materialization-chain being configurable to execute said de-materialization-programs in parallel, or sequentially or in mixtures thereof.

10. A computer system according to claim 9, wherein each of said de-materialization-program is being executed based on the current contents of said output-container.

11. A computer system according to claim 10, wherein said de-materialization-means completed said de-materialization of said output-container if the last de-materialization-program of said de-materialization-chain completed execution.

12. A computer system according to claim 9, wherein said de-materialization-means completed said de-materialization of said output-container if the last de-materialization-program of said de-materialization-chain completed execution.

13. A computer system according to claim 8, wherein said de-materialization-means is at least one of (i) part of said output-container and (ii) part of said data-member.

14. A computer system according to claim 8, wherein said process-activity and said input-container and said output-container is part of a process-model for a workflow-process-environment managed and executed by said computer system.

15. A computer system acting as a workflow-management-system (WFMS) managing and executing at least one process-model said process-model encompassing at least one connector said connector being associated with at least one condition-parameter, its truth value indicating to said WFMS whether to follow said connector, said computer system being further characterized by parameter-determination-means encompassing at least one parameter-determination-program said parameter-determination-program being executed for at least one of (i) retrieving said conditions-parameter's contents from arbitrary storage areas and (ii) manipulating said condition-parameter's contents before said WFMS is evaluating said condition-parameter's truth value.

* * * * *

UNITED STATES PATENT AND TRADEMARK OFFICE
CERTIFICATE OF CORRECTION

PATENT NO. : 6,073,111
DATED : June 6, 2000
INVENTOR(S) : Frank Leymann, et al.

It is certified that error appears in the above-identified patent and that said Letters Patent is hereby corrected as shown below:

<u>Title page,</u>
[75] Inventors: "both of Germany" should read -- both of Fed Rep Germany --
[56] References Cited, OTHER PUBLICATIONS: "vol." should read -- Vol. --

Signed and Sealed this

Twenty-fifth Day of September, 2001

Attest:

NICHOLAS P. GODICI
Acting Director of the United States Patent and Trademark Office Attesting Officer